United States Patent [19]

Mori

[11] Patent Number: 4,684,209

[45] Date of Patent: * Aug. 4, 1987

[54] DEVICE FOR DIVERTING LIGHT THROUGH A PLURALITY OF OPTICAL CONDUCTOR RODS

[76] Inventor: Kei Mori, 3-16-3-501, Kaminoge, Setagaya-ku, Tokyo, Japan

[*] Notice: The portion of the term of this patent subsequent to Jul. 28, 2004 has been disclaimed.

[21] Appl. No.: 677,159

[22] Filed: Dec. 3, 1984

[30] Foreign Application Priority Data

Dec. 27, 1983 [JP] Japan ............................ 58-248949

[51] Int. Cl.⁴ .............................................. G02B 6/26
[52] U.S. Cl. ................................. 350/96.15; 350/173; 350/267; 350/486; 362/32
[58] Field of Search ............... 350/96.15, 96.16, 96.18, 350/267, 484, 486, 170, 171, 172, 173; 362/32

[56] References Cited

U.S. PATENT DOCUMENTS

| | | | |
|---|---|---|---|
| 4,173,390 | 11/1979 | Käch | 350/96.16 |
| 4,339,170 | 7/1982 | Winzer | 350/172 |
| 4,400,054 | 8/1983 | Biard et al. | 350/96.15 |
| 4,576,436 | 3/1986 | Daniel | 350/96.15 X |
| 4,636,028 | 1/1987 | Mori | 350/96.15 |

FOREIGN PATENT DOCUMENTS

| | | | |
|---|---|---|---|
| 2823458 | 12/1978 | Fed. Rep. of Germany | 350/484 |
| 0012849 | 1/1977 | Japan | 350/172 |
| 0003411 | 1/1984 | Japan | 350/96.15 |
| 0103318 | 6/1985 | Japan | 350/96.16 |

*Primary Examiner*—John Lee
*Attorney, Agent, or Firm*—Jordan and Hamburg

[57] ABSTRACT

A light diverting device for diverting a part of the light energy transmitted through an optical conductor rod and for taking it out of the optical conductor. The device is comprised of a first optical conductor rod having a through-hole in a radial direction, a second optical conductor rod tightly inserted into the through-hole at the halfway point and firmly fixed thereon, a third optical conductor rod tightly inserted into a remaining portion of the through-hole, and a fourth optical conductor rod firmly fixed on an outer circumferential surface of the first optical conductor rod so as to cover the inserted portion of the second optical conductor rod. Optical oil is enclosed between an inclined surface of the second optical conductor rod and the third optical conductor rod. The third optical conductor rod is constructed movably inside the through-hole.

8 Claims, 7 Drawing Figures

4,684,209

DEVICE FOR DIVERTING LIGHT THROUGH A PLURALITY OF OPTICAL CONDUCTOR RODS

BACKGROUND OF THE INVENTION

The present invention relates to a light diverting device for diverting a part of the light energy transmitted through an optical conductor rod and for taking it out of the optical conductor.

The present applicant has previously proposed in various ways that solar rays or artificial rays be focused by means of a lens or the like, guided into an optical conductor, and further transmitted through the optical conductor onto an optional desired place for use in illumination or for other purposes.

However, on that occasion, if the light energy propagating through the optical conductor can be diverted at the halfway point and taken out from it, it might be possible to improve its utility and efficiency to a greater extent. Conventionally, such light diverting means didn't exist so that it was very inconvenient to utilize the device.

SUMMARY OF THE INVENTION

It is an object of the present invention to provide a light diverting device in which a part of the light energy propagating through the optical conductor rod is diverted and taken out therefrom.

Another object of the present invention is to provide a light diverting device in which, when an optical conductor for receiving the diverted light rays is connected, the light rays are automatically diverted into the optical conductor.

Another object of the present invention is to provide a light diverting device in which the amount of diverted light rays can be adjusted in the room which is illuminated by them.

BRIEF DESCRIPTION OF THE DRAWINGS

FIG. 3 is a detailed view showing an inclined surface 2a;

DETAILED DESCRIPTION OF THE PREFERRED EMBODIMENTS

Figure 1:
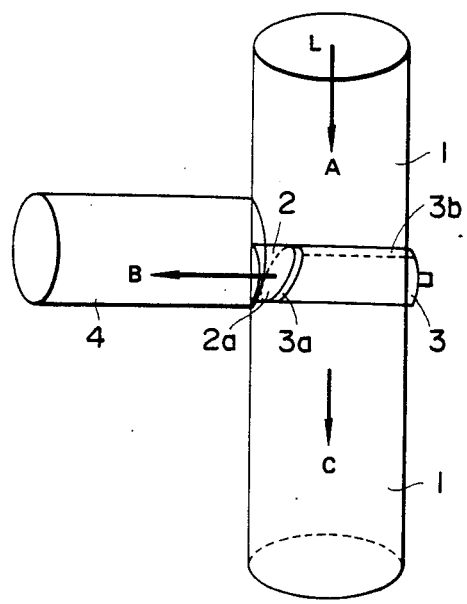
FIG. 1 is a front view illustrating a construction of an embodiment of a light diverting device according to the present invention.
Figure 2:
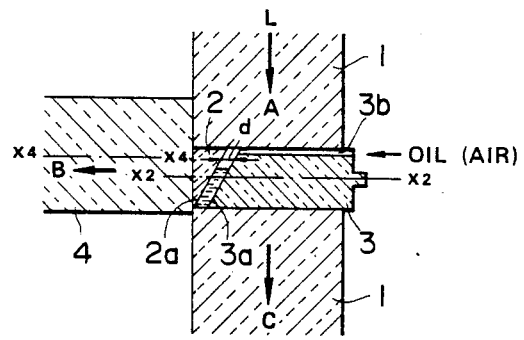
FIG. 2 is a cross-sectional view of the embodiment shown in FIG. 1.

FIGS. 1 and 2 illustrate a construction of an embodiment according to the present invention. In those figures, 1 is a first optical conductor rod and it has a through-hole in a radial direction. A second optical conductor rod 2 and a third optical conductor rod 3 are tightly inserted into the through-hole and the former is firmly fixed by use of an optical paste or the like. The edge surface portion of the second optical conductor rod 2 in the through-hole is formed on the surface 2a and inclined in relation to the direction of the first optical conductor rods's axis. The third optical conductor rod 3 has an inclined surface 3a opposed to the inclined surface 2a of the second optical conductor rod 2. The inclined surface 2a is formed on the surface which is inclined in such a manner that the light rays L guided into the second optical conductor rod 2 from a direction perpendicular to the axis line $X_2$ of the second optical conductor rod 2, in other words, the light rays L guided into the second optical conductor rod 2 from the direction A shown in FIG. 2 are reflected on the inclined surface 2a of the second optical conductor rod 2 and guided in the direction of the second optical conductor rod's 2 axis, that is, in the direction of axis $X_2$ so as to be transmitted through the second optical conductor rod 2, namely, the light rays are reflected in the direction shown by arrow B in FIG. 2.

Furthermore, the third optical conductor rod 3 is reciprocatedly and tightly inserted into the through-hole. A groove 3b is formed on the uppermost portion of the third optical conductor rod 3 along the direction of the axis. Optical oil is poured into the gap between the inclined surface 2a of the second optical conductor rod 2 and the inclined surface 3a of the third optical conductor rod 3. When the third optical conductor rod 3 is moved back and forth, the air in the gap is let out or air is sucked it in order to facilitate the movement of the third optical conductor rod 3.

In such a manner, after pouring optical oil into the gap d, when the third optical conductor rod 3 is pushed forward the distance of the gap d becomes smaller and therefore the level of optical oil rises up. On the contrary, when it is pulled backward the size of the gap d becomes greater and therefore the level of the optical oil goes down. The light rays L propagating through the first optical conductor rod 1 are reflected on the inclined surface 2a of the second optical conductor rod 2 and directed toward B of the area of the gap where there is no optical oil. Otherwise, the light rays are directed in direction C of the area of the gap where the optical oil is. On that occasion, the amount of light rays propagating in direction B can be adjusted by controlling the level of optical oil. The range of such adjustment can be changed in relation to the insertion depth of the third optical conductor rod 3.

The numeral 4 represents a fourth optical conductor rod firmly fixed on the outer circumferential surface of the first optical conductor rod 1 covering the insertion part of the second optical conductor rod 2 or unitarily formed together with it. In such a situation, the light rays diverted in direction B, as shown before, are taken out of the optical conductor rod 4. Furthermore the light rays are transmitted through the optical conductor cable (not shown in FIGS. 1 and 2), connected with the fourth optical conductor rod 4, and directed onto an optional desired place for use in illumination or for other purposes.

The present application has already proposed a light diverting device based on the operational principles outlined above. (Japanese patent application JAP No. 58-211643.) The present invention proposes to further improve the light diverting device previously proposed in which light rays could be effectively diverted. This is especially so in relation to the location of the gap d between the inclined surface 2a of the second optical conductor rod 2 and the inclined surface 3a of the third optical conductor rod 3 which approaches as closely as possible to the side of the fourth optical conductor 4 as shown in FIGS. 1 and 2. In addition, the central axis $X_4$ of the fourth optical conductor rod 4 is displaced to the light source side from the central axis $X_2$ of the second optical conductor rod.

The light rays propagating from the optical conductor rod 1, as mentioned before, are reflected on the inclined surface 2a of the second optical conductor rod 2 and directed in the direction of B in the area of the gap d where optical oil exists. In practice, in the lower portion of the gap d, optical oil is always more or less present. The center of the part which can be utilized most effectively as the reflecting surface is displaced to a little higher position (the light source side) than the central axis $X_2$ of the second optical conductor rod 2. Consequently, when the central axis $X_4$ of the fourth optical conductor rod 4 is displaced to a higher position (the light source side) than the central axis $X_2$ of the second optical conductor by the amount of above-mentioned displacement, the light rays reflected on the inclined surface 2a can be guided more effectively into the fourth optical conductor rod 4.

Figure 3:
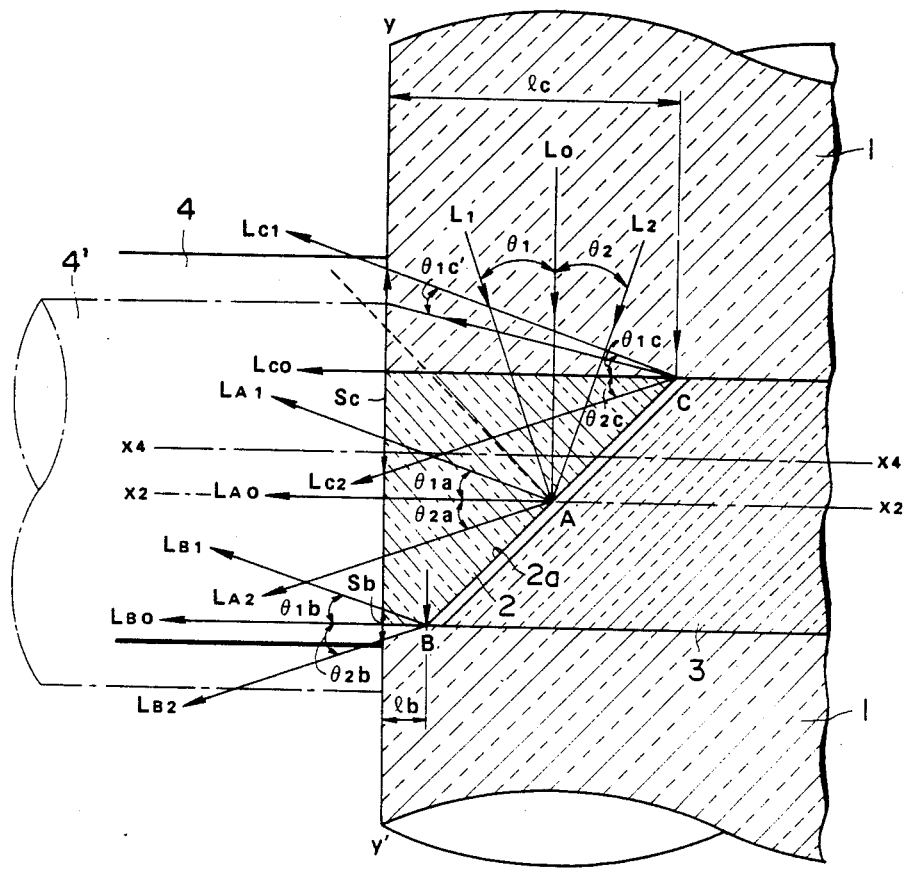

FIG. 3 is an enlarged view showing the state of the reflection off of the inclined surface 2a. Light rays $L_0$ in parallel with the axis of the first optical conductor rod 1 and light rays $L_1$, $L_2$ having respectively, maximum deflecting angles $\theta_1$, $\theta_2$ in relation to the light rays $L_0$ are transmitted into the first optical conductor rod 1, where $\theta_1$, is equal to $\theta_2$ ($\theta_1=\theta_2$) and those angles differ depending on the refractive index of the first optical conductor rod 1, for instance, both of the angles of the general quartz rod are approximately 22° through 23°. Supposing that the inclination angle of the inclined surface 2a is 45° and the diameter of the fourth optical conductor rod is equal to that of the second optical conductor rod 2, at point A, the parallel light rays $L_0$ are reflected in a direction parallel with the axis of the second optical conductor rod 2 and turn out to be $LA_0$. Similarly, $L_1$ and $L_2$ turn out to be $LA_1$ and $LA_2$, respectively. All of the incident light rays arriving at point A are transmitted into the fourth optical conductor rod 4. However, with respect to the light rays reflected at point B, the light rays in the range of $LB_0$–$LB_2$ ($\theta_2 b$) cannot be guided into the fourth optical conductor rod 4. Additionally with respect to the light rays reflected at point C, the light rays in the range of $LC_0$–$LC_1$ ($\theta_1 c$) cannot be guided into the fourth optical conductor rod 4.

However, if those reflected light rays mentioned above are intended to be guided into the fourth optical conductor rod 4, its diameter needs to be increased. However, in consideration of the cost, it is preferable to make the diameter of rod 4 as small as possible. In fact, the more distant the reflected light rays are from the reflection point, the larger the square measure of the reflected light rays will be. For this reason, for example, where the distance from point B to the output edge of the second optical conductor rod 2 is lb and that from point C to the output edge of the same is lc (in FIG. 3), lc is larger than lb (lc>lb) and the respective expanding square measures of the light rays relate to Sb and Sc. In that case Sc is larger than Sb (Sc>Sb).

Consequently, it may be understood from the foregoing description that the inclined surface 2a is allowed to come as close to the output edge of the second optical conductor rod 2 as is possible. The cross-sectional square measure of the fourth optical conductor rod 4 can therefore be decreased. As regards the direction of the light's propagation, the distance from the inclined surface 2a to the fourth optical conductor rod 4 is small (refer to lb), and in the nearby area relating to the same, the distance is large (refer to lc). Therefore, as shown in FIG. 3, if the axis line $X_4$ of the fourth optical conductor rod 4 is moved toward the light's propagation side (toward the light source side) in relation to the axis line $X_2$ of the second optical conductor rod 2, the light rays reflected on the inclined surface 2a can be more effectively guided into the fourth optical conductor rod 4.

Specifically in FIG. 3, if the axis line $X_2$ of the second optical conductor rod 2 and the axis line $X_4$ of the fourth optical conductor rod 4 coincide with each other, the fourth optical conductor rod 4 will be situated at the position shown by a dot-and-dash line 4' and therefore a part of the light rays shown by angle $\theta_1 c'$ cannot be guided into the fourth optical conductor rod 4. However, as is the case with the present invention, if the axis line $X_4$ of the optical conductor rod 4 is displaced toward the light source side in relation to the axis line $X_2$ of the second optical conductor rod 2, even the light rays of range $\theta_1 c'$ can be guided into the optical conductor rod 4.

As an example for employing the above-mentioned light diverting device, it has already been suggested that a solar ray collecting device be equipped on the rooftop of a building, the solar rays to be collected by the solar ray collecting device being guided into the afore-mentioned optical conductor 1. Solar rays, transmitted through the optical conductor 1, are diverted inside the light diverting device as mentioned before so as to distribute the transmitted solar rays onto the respective floors of the building. On that occasion, the first optical conductor rod 1 is installed in the wall of the building and the fourth optical conductor rod 4 is installed in a space on the ceiling thereof. As a matter of course, those optical conductor rods are installed in pipes and connected with each other. The amount of light rays distributed to the respective floors is adjusted by changing the insertion depth of the third optical conductor rod 3 in the light diverting device. In such a case it is desirable to adjust the amount of light rays. However, as regards the earlier type of light diverting device, the insertion depth of the third optical conductor rod 3 has to be adjusted from the rear side of the wall. It is very inconvenient.

Figure 4:
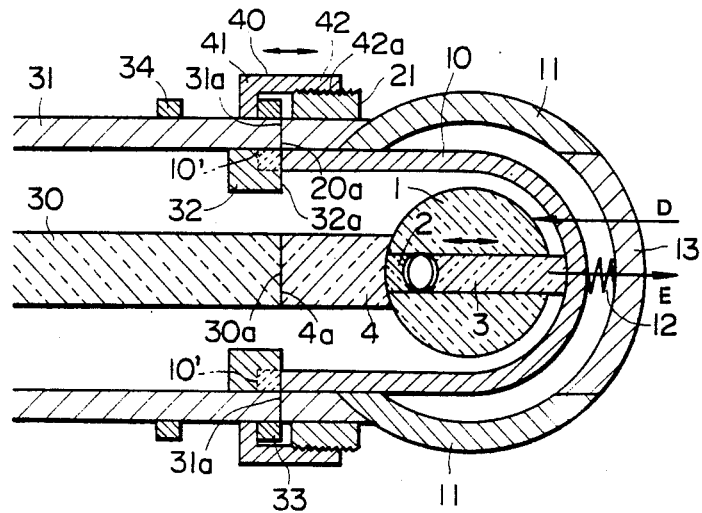
FIG. 4 is a cross-sectional plane view illustrating a construction of another embodiment of the present invention.

FIG. 4 is a cross-sectional plane view illustrating another embodiment of the present invention made in consideration of this problem. In FIG. 4, 1 through 4 are optical conductor rods performing the same action as that of the light diverting device. As mentioned before, optical oil is enclosed in the space between the inclined surface of the second optical conductor rod 2 and that of the third optical conductor rod 3. The amount of light rays diverted is determined by moving the third optical conductor rod 3 in the direction shown by the arrow.

In FIG. 4, 10 is a U-shaped member unitarily constructed together with the third optical conductor rod 3, 11 is a protecting pipe for protecting the first optical conductor rod 1, 12 is a spring, and 13 is a cover member unitarily covering the spring 12. The protecting pipe 11 is notched in the diverting portion at a symmetrical position along the axis line of the third optical conductor rod 3, and the U-shaped member 10 is unitarily containing the third optical conductor rod 3 and is inserted in the direction shown by arrow D. After inserting the U-shaped member 10, when the cover member 13 is firmly attached to the protecting pipe 11 as shown in FIG. 4 the U-shaped member 10 is pushed in the direction of D by means of the spring 12 and the edge portion thereof is situated at the position shown by a dotted line 10'. At this time, the space between the inclined surface of the second optical conductor rod 2 and that of the third optical conductor rod 3 is filled with optical oil and the light rays propagating through the first optical conductor rod 1 are not diverted to the side of the fourth optical conductor rod 4.

The protecting pipe for the fourth optical conductor rod 4 is represented by 20. The edge surface 20a of the protecting pipe 20 is constructed on the same surface as the edge surface 4a of the fourth optical conductor rod 4. 30 is an optical conductor for diverting the light rays and 31 is a protecting pipe for protecting the optical conductor 30. The edge surface 30a of the optical conductor 30 and the edge surface 31a of the protecting pipe 31 are formed on the same plane (same edge surface). On the inner circumferential surface of the protecting pipe 31 is fixedly mounted a pusher member 32 having an outer edge surface 32a coinciding with the edge surface 31a of the protecting pipe 31. Furthermore a couple of stopper members 33 and 34 are mounted on the outer circumferential surface of the protecting pipe 31 leaving a predetermined gap in the direction of the axis, and a leg portion 41 of a coupling member 40 is situated in the space between them. The coupling member 40 is supported so as to move in the direction shown by the arrow. The inner circumferential surface of another edge portion 42 of the coupling member 40 has a threaded portion 42a engaged with a threaded portion of a screw member 21 installed on the outer circumferential surface of the protecting pipe 20. Consequently, at the time of the connection, when the edge surface of the optical conductor 30 comes into contact with that of the optical conductor 4 and the threaded portion of the coupling member 40 is screwed in by an engaging movement with the screw member 21, the optical conductor rod 30 can be connected with the optical conductor rod 4. Then the U-shaped member 10 is pushed back by the pusher member 32 in the direction of arrow E. Consequently, the gap between the optical conductors 2 and 3 becomes wider and the level of optical oil in the gap goes down so that the light rays from the optical conductor rod 1 are diverted into the optical conductor rod 30.

In such a manner, according to the embodiment, when the optical conductor rod for diverting the light rays is connected with the other, the light rays are automatically diverted into the light diverting optical conductor. When it is disconnected from the other, the light rays are automatically shut out. As a result, the connecting works may be simplified.

Figure 5:
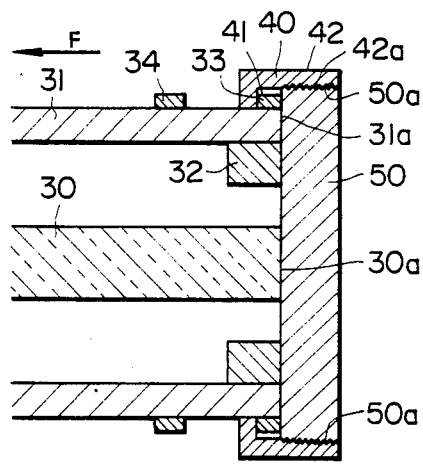
FIG. 5 is a cross-sectional view showing the construction of the edge portion of the optical conductor tube preferably used in the FIG. 4 embodiment of the present invention.

FIG. 5 is a cross-sectional view showing the construction of the edge portion of the afore-mentioned optical conductor tube for diverting the light rays at the time when it is not being used. In FIG. 5, 50 is a protecting blockage disk member and the outer circumferential portion of the disk member is threaded. This threaded portion 50a is engaged with the threaded portion 42a of the coupling member 40. When the device is not being used, it is carried by a truck from the factory, the protecting blockage disk member 50 is turned by means of a coupling member 40 and blocks up the edge surface of the optical conductor tube, as shown in FIG. 5, for the purpose of preventing the edge surface portion of the optical conductor tube 30 from being broken and for preventing dust or dirt from entering the optical conductor tube. A stopper 34 is used for preventing the coupling member 40 from coming out and falling down in the direction shown by arrow F while it is in operation.

Figure 6:
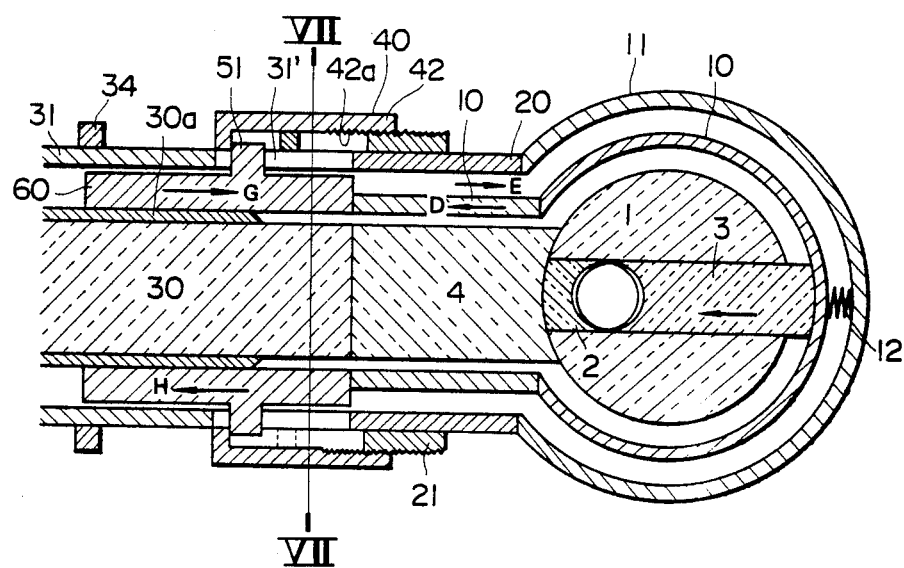
FIG. 6 is a cross-sectional plane view illustrating a construction of still another embodiment of the present invention.
Figure 7:
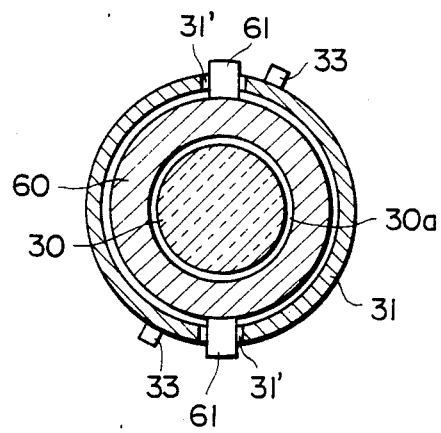
FIG. 7 is a cross-sectional view taken along the section line VII—VII of FIG. 6.

FIG. 6 is a cross-sectional, plane view illustrating still another embodiment of the present invention. FIG. 7 is a cross-sectional view taken along section line VII—VII of FIG. 6. In those figures, the same reference numeral as that of FIG. 4 is attached to the part performing the same action as in FIG. 4. In this embodiment, the amount of diverted light rays can be adjusted inside the illuminated room. As shown in FIGS. 6 and 7, a sleeve 60 is installed between the optical conductor 30 and the protecting pipe 31 movably in both directions as shown by arrows G and H. After the optical conductor 4 comes into contact with the optical conductor 30, the coupling member 40 is screwed in by an engaging movement with the screw member 21 so as to move the sleeve 60 in the direction of arrow G. In this embodiment, slits 31' are bored at the edge portion side of the protecting pipe 31 along the direction of the axis thereof. The projecting portion 61 of the sleeve 60 engages with the slits 31' in such a manner that the sleeve 60 can move in direction G along the slits 31'.

Consequently, at first, when optical conductor 4 comes into contact with the optical conductor 30, the light rays from optical conductor 1 are not diverted to optical conductor 30. After that, when the coupling member 40 is screwed in by an engaging movement with the screw member 21 the projecting portion 61 of the sleeve 60 is pushed in the direction of G by the coupling member 40 and thereby the U-shaped member 10 is pushed in the direction of arrow E. The amount of light rays diverted into the optical conductor 30 increases in accordance with the amount being pushed out or the amount being screwed in by the coupling member 40. When the amount being screwed in by the coupling member 40 decreases, the U-shaped member 10 is pushed back in direction D by the spring 12 and thereby the sleeve 60 is pushed back in the direction of arrow H. In such a manner, the amount of diverted light rays can be adjusted to the optimum desired amount by adjusting the amount being screwed in through the use of the coupling member 40. Furthermore, since the adjustment works can be performed at the diverted-light supply side, it might be possible to adjust the amount of light rays desired.

The device, according to the present invention, is to be employed on earth. However, it could be employed in a space station. On that occasion, since there exists no gravity there, optical oil becomes round by the action of surface tension therein and is located at the optional position of the gap between the inclined surfaces 2a and 3a. And even on that occasion, since the square measure of the area in which optical oil comes into contact with the inclined surface 2a relates to the size of the gap, by adjusting the gap, the amount of diverted light rays can be increased or decreased by adjusting the gap.

As is apparent from the foregoing description, according to the present invention, the light rays propagating through the optical conductor can be effectively diverted and taken out. Furthermore when the optical conductor for diverting light rays is connected, they are diverted automatically into the optical conductor. Otherwise, it may be possible to provide a light diverting device in which the amount of diverted light rays can be adjusted in the room which is illuminated by them.

What is claimed is:

1. A light diverting device comprising a first optical conductor rod for receiving light from a light source having an axis in an axial direction and a through-hole in a radial direction, said through-hole comprising first and second portions, a second optical conductor rod having an axis and being tightly inserted into said through-hole in said first portion and firmly fixed therein, said second optical conductor rod having a first edge surface inclined in relation to the axis of said first optical conductor rod for diverting light from said first optical conductor rod, a third optical conductor rod tightly inserted into the second portion of said through-hole, said third optical conductor rod having a second inclined edge surface for engaging said first inclined edge surface of said second optical conductor rod, the first and second edge surfaces defining an inclined spaced therebetween, a fourth optical conductor rod having an axis and being firmly fixed on an outer circumferential surface of said first optical conductor rod to cover the first portion of said through-hole to receive light diverted from said second optical conductor rod, optical oil enclosed in said inclined space at a variable level between the first and second inclined edge surfaces, means for moving said third optical conductor rod in said through-hole to vary the level of optical oil, wherein the inclined space defined between said first and second inclined edge surfaces is formed off the axis of said first optical conductor rod toward said fourth optical conductor rod, and the axis of said fourth optical conductor rod is located nearer to the light-source than the axis of said second optical conductor rod.

2. A light diverting device comprising a first optical conductor rod for receiving light from a light source having an axis in an axial direction and a through-hole in a radial direction, said through-hole comprising first and second portions, a second optical conductor rod tightly inserted into said through-hole in said first portion and firmly fixed therein, said second optical conductor rod having a first edge surface inclined in relation to the axis of said first optical conductor rod for diverting light from said first optical conductor rod, a third optical conductor rod tightly inserted into the second portion of said through-hole, said third optical conductor rod having a second inclined edge surface for engaging said inclined edge surface of said second optical conductor rod, the first and second inclined edge surfaces defining an inclined space therebetween, a fourth optical conductor rod having an axis and being firmly fixed on an outer circumferential surface of said first optical conductor rod to cover the first portion of said through-hole to receive light diverted from said second optical conductor rod, optical oil enclosed at a particular level in said inclined space between the first and second inclined edge surfaces, said third optical conductor rod comprising a light diverting portion capable of moving inside the through-hole to drop or raise the level of optical oil, said light diverting portion being installed in a pipe, and means for moving the second inclined surface of said third optical conductor rod away from the first inclined surface of said second optical conductor rod when a fifth optical conductor rod for diverting light rays is connected with said fourth optical conductor rod.

3. A light diverting device as in claim 2, wherein the means for moving the second inclined surface of the third optical conductor rod away from the first inclined surface of the second optical conductor rod comprises means for automatically moving the second inclined surface away from the first inclined surface when the fifth optical conductor rod is connected to the fourth optical conductor rod.

4. A light diverting device as in claim 3, wherein optical oil fills the inclined space between the first and second inclined edge surfaces when the fifth optical conductor rod is not connected to the fourth optical conductor rod to prevent any light from being diverted to the fourth optical conductor rod.

5. A light diverting device as in claim 4, wherein the means for automatically moving the second inclined surface comprises a coupling member associated with the fifth optical conductor rod for coupling the fifth rod to the fourth optical conductor rod, whereby, when the fourth and fifth rods are coupled, the second inclined surface is moved away from the first inclined surface, the optical oil level in the inclined space between the first and second inclined surfaces drops and light from the first optical conductor rod is diverted to the fourth optical conductor rod.

6. A light diverting device as in claim 5, wherein the coupling member comprises means for varying the distance the second inclined surface is moved away from the first inclined surface.

7. A light diverting device comprising a first optical conductor rod for receiving light from a light source having an axis in an axial direction and a through-hole in a radial direction, said through-hole comprising first and second portions, a second optical conductor rod having an axis and being tightly inserted into said through-hole in said first portion and firmly fixed therein, said second optical conductor rod having a first edge surface inclined in relation to the axis of said first optical conductor rod, a third optical conductor rod tightly inserted into the second portion of said through-hole, said third optical conductor rod having a second inclined edge surface for engaging said first inclined edge surface of said second optical conductor rod, a fourth optical conductor rod having an axis and being firmly fixed on an outer circumferential surface of said first optical conductor rod to cover the first portion of said through-hole to receive light diverted from said second optical conductor rod, said third optical conductor rod comprising a light diverting portion capable of moving inside the through-hole, said light diverting portion being installed in a pipe, and a diverted-light amount adjusting means for moving said third optical conductor rod to adjust the amount of light diverted by said light diverting portion.

8. A light diverting device as in claim 7, further comprising a fifth optical conductor rod, wherein the diverted-light amount adjusting means comprises means for coupling the fifth optical conductor rod to the fourth optical conductor rod and sleeve means associated with the coupling means for variably moving the third optical conductor rod.

* * * * *